(12) United States Patent
Yamashita et al.

(10) Patent No.: US 10,758,864 B2
(45) Date of Patent: *Sep. 1, 2020

(54) VOC REFINING APPARATUS

(71) Applicant: Panasonic Intellectual Property Management Co., Ltd., Osaka (JP)

(72) Inventors: Hideki Yamashita, Osaka (JP); Daisuke Tabata, Osaka (JP); Akira Isomi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 18 days.

This patent is subject to a terminal disclaimer.

(21) Appl. No.: 15/959,091

(22) Filed: Apr. 20, 2018

(65) Prior Publication Data

US 2018/0345214 A1   Dec. 6, 2018

(30) Foreign Application Priority Data

Jun. 6, 2017 (JP) ................. 2017-111466

(51) Int. Cl.
*B01D 1/20* (2006.01)
*B05B 7/04* (2006.01)
(Continued)

(52) U.S. Cl.
CPC ............. *B01D 53/72* (2013.01); *B01D 1/20* (2013.01); *B01D 19/0047* (2013.01);
(Continued)

(58) Field of Classification Search
CPC .... B01D 1/16; B01D 1/18; B01D 1/20; B05B 7/0441; B05B 7/045; B05B 7/0458;
(Continued)

(56) References Cited

U.S. PATENT DOCUMENTS 5,553,785 A * 9/1996 Haruch ................. B05B 1/3436
                                                    239/432
5,632,102 A * 5/1997 Luy ............................ B01J 2/16
                                                    34/372

(Continued)

FOREIGN PATENT DOCUMENTS

| JP | 2003-510170 | 3/2003 |
| JP | 2007-513745 | 5/2007 |
| JP | 2012-157808 | 8/2012 |
| JP | 5187861 B | 4/2013 |

OTHER PUBLICATIONS

Extended European Search Report dated May 28, 2018 in related European Patent Application No. 18164886.6.

*Primary Examiner* — Jonathan Luke Pilcher
(74) *Attorney, Agent, or Firm* — Wenderoth, Lind & Ponack, L.L.P.

(57) ABSTRACT

A particle diameter is decreased and a surface area per unit flow amount is increased by spraying a VOC-containing liquid from a spraying device spraying that is a two-fluid nozzle in a vacuum container, so that only water in the VOC-containing liquid can be greatly evaporated and exhausted, and a concentrated VOC-containing liquid having high concentration can be refined and processed.

13 Claims, 3 Drawing Sheets

(51) Int. Cl.
*C02F 1/12* (2006.01)
*B01D 53/72* (2006.01)
*B01D 19/00* (2006.01)
*B05B 1/00* (2006.01)
*B01D 53/78* (2006.01)
*C02F 101/34* (2006.01)
*C02F 101/30* (2006.01)
*C02F 101/38* (2006.01)

(52) U.S. Cl.
CPC .............. *B01D 53/78* (2013.01); *B05B 1/005* (2013.01); *B05B 7/0458* (2013.01); *B05B 7/0466* (2013.01); *B01D 2257/708* (2013.01); *B05B 7/045* (2013.01); *B05B 7/0408* (2013.01); *B05B 7/0475* (2013.01); *C02F 1/12* (2013.01); *C02F 2101/30* (2013.01); *C02F 2101/34* (2013.01); *C02F 2101/38* (2013.01)

(58) Field of Classification Search
CPC ..... B05B 7/0466; B05B 7/0475; C07C 29/80; C07C 31/202; C02F 2301/063; C02F 2101/30; C02F 2101/34; C02F 2101/38
See application file for complete search history.

(56) References Cited

U.S. PATENT DOCUMENTS

| | | | |
|---|---|---|---|
| 6,161,778 A * | 12/2000 | Haruch | B05B 7/0458 239/290 |
| 6,322,003 B1 * | 11/2001 | Haruch | B05B 7/0458 239/290 |
| 6,538,164 B1 | 3/2003 | Gallagher et al. | |
| 7,087,157 B2 * | 8/2006 | Spani | B01D 1/16 202/182 |
| 7,108,203 B2 * | 9/2006 | Huffman | B05B 7/0466 239/427 |
| 9,907,877 B2 * | 3/2018 | Minamio | A61L 9/145 |
| 10,272,456 B2 * | 4/2019 | Isomi | B05B 7/0441 |
| 2004/0222317 A1 * | 11/2004 | Huffman | B05B 7/0466 239/398 |
| 2006/0169800 A1 | 8/2006 | Rosell et al. | |
| 2012/0193301 A1 * | 8/2012 | Fujioka | B01D 1/14 210/750 |
| 2013/0299336 A1 | 11/2013 | Otsuki et al. | |
| 2016/0361454 A1 * | 12/2016 | Minamio | A61L 9/145 |
| 2017/0203313 A1 * | 7/2017 | Tabata | B05B 7/0483 |
| 2019/0015854 A1 * | 1/2019 | Tabata | B01D 1/20 |

\* cited by examiner

VOC REFINING APPARATUS

BACKGROUND

1. Technical Field

The present disclosure relates to a VOC refining apparatus for concentrating and collecting the volatile chemical substance volatile organic compounds (VOC) having a higher boiling point than that of water contained in an exhaust gas and a hydrophilic property not to be azeotropic with water by using a difference in a boiling point or a vapor pressure between the volatile chemical substance VOC and water.

2. Description of the Related Art

A VOC processing method includes a combustion method and a solvent collecting method, and the combustion method includes a direct combustion method, an oxidation catalyst method, a heat storage method, and a micro gas turbine (MGT) fuel method. Which method is best suited depends greatly on operating conditions of a factory such as a solvent type, an air volume, concentration, or a temporal fluctuation of the VOC, or an actual energy usage of a factory. A detailed examination of a life cycle cost and an introduction of a flexible processing apparatus which can cope with a change in an operation even if the change in the operation occurs in the future are required.

As a VOC separating and collecting method in a removing liquid of the related art, there is a method using an air flow vacuum evaporating method (vacuum evaporating method) for spraying the removing liquid into a vacuum container (for example, see Japanese Patent No. 5187861). FIG. 3 is a view of a schematic configuration of a VOC separating and collecting apparatus described in Japanese Patent No. 5187861. In VOC separating and collecting apparatus 1, processed removing liquid Ld stored in storage tank 3 is pressure-fed by liquid feeding pump 5, and is sprayed from nozzle 7 in vacuum container 9. On the other hand, an inside of vacuum container 9 is depressurized by an action of vacuum pump 11 and thereby the VOC is vacuum-evaporated from processed removing liquid Ld. Since processed removing liquid Ld is in a form of mist by spraying, a surface area thereof is dramatically enlarged as compared to that of a case of simply storing processed removing liquid Ld. Mist-like processed removing liquid Ld eventually reaches open-cell foam body 17a and adheres to a cell wall. The surface area of processed removing liquid Ld adhered to the cell wall is further enlarged. The surface area of processed removing liquid Ld, which is enlarged and enlarged, is expanded. Together therewith, an introduction of an evaporation promoting gas (air) via gas introduction mechanism 13 improves an efficiency of the vacuum evaporation. That is, the collection (conversion to a regeneration removing liquid Lc) of processed removing liquid Ld is efficiently performed. Processed removing liquid Ld becomes regeneration removing liquid Lc while passing through (descending) open-cell foam body 17a, and regeneration removing liquid Lc drips through open-cell foam body 17a and support body 17b. Dripped regeneration removing liquid Lc is discharged to an outside of vacuum container 9 via liquid discharge mechanism 15 and is provided for reuse. Vacuum evaporated VOC is sucked by vacuum pump 11 and then is processed by VOC processing mechanism 19. VOC processing mechanism 19 is adapted to collect the VOC and perform processing capable of reusing. If reuse of the VOC is unnecessary, the VOC is simply removed.

According to the apparatus and the method, the VOC in the liquid containing the VOC can be efficiently separated and collected, and it is not necessary to heat and cool the VOC. Therefore, it is possible to separate and collect the VOC with low running cost.

SUMMARY

An aspect of the disclosure provides a VOC refining apparatus including a vacuum container; a liquid feeding pump that supplies a VOC-containing liquid including water into the vacuum container; a spraying device that is disposed in the vacuum container and sprays the VOC-containing liquid supplied from the liquid feeding pump into the vacuum container; a vacuum pump that is connected to the vacuum container and depressurizes an inside of the vacuum container to vacuum-evaporate moisture included in the VOC-containing liquid; and a liquid discharge member that discharges a VOC-concentrated liquid after moisture evaporation processing from the vacuum container. The spraying device includes a spraying device main body that has a liquid passageway and a gas passageway, an inner lid that is disposed at a tip of the spraying device main body, covers an opening of the liquid passageway, and has a flat inner end portion, an outer lid that is disposed at the tip of the spraying device main body, covers the inner lid, covers an opening of the gas passageway, and has a flat outer end portion facing the inner end portion of the inner lid, a gas-liquid mixing section that is disposed between the inner lid and the outer lid, is formed at a space of a disc-shaped profile between the inner end portion of the inner lid and the outer end portion of the outer lid, and mixes a gas flow flowing through the gas passageway and a liquid flow flowing through the liquid passageway, a liquid inlet that is provided so as to penetrate at least one portion of the inner end portion of the inner lid in a axial direction, communicates with the gas-liquid mixing section, and allows a liquid flow flowing through the liquid passageway to enter the gas-liquid mixing section, a gas inlet that is disposed so as to communicate with the gas-liquid mixing section on a side portion of the gas-liquid mixing section between the inner lid and the outer lid, and allows the gas flow flowing through the gas passageway to enter the gas-liquid mixing section toward the liquid flow entering the gas-liquid mixing section from the liquid inlet, and a spout that is provided so as to penetrate the outer end portion of the outer lid, communicates with the gas-liquid mixing section, and spouts a liquid atomized by mixing the gas flow and the liquid flow in the gas-liquid mixing section.

According to the aspect of the disclosure, since the VOC-containing liquid is sprayed into the vacuum container that functions as a VOC collecting device by using the spraying device that is a two-fluid nozzle, a particle diameter of the VOC-containing liquid can be greatly reduced and it is possible to quickly vacuum-evaporate moisture from the VOC-containing liquid. Therefore, evaporation and separation of moisture from the VOC-containing liquid accelerate and there is an effect that refining processing efficiency of the VOC improves.

DETAILED DESCRIPTION

Prior to describing an exemplary embodiment, problems in the related art will be briefly described.

In the apparatus using the air flow vacuum evaporating method in Japanese Patent No. 5187861, when the removing liquid is sprayed into the vacuum container, a single-fluid nozzle is used and a particle diameter thereof is large. Therefore, there is a problem that an evaporation rate is low and refining processing capacity of the VOC is low. In order to improve the efficiency of vacuum evaporation, air is introduced from the gas introduction mechanism, but moisture included in the air enters the vacuum container of the VOC refining apparatus, thereby hindering evaporation, volatilization, and separation of the VOC. Similarly, there is a problem that refining collection and processing capacity of the VOC does not rise.

The disclosure is made to solve the problems and an object of the disclosure is to provide a VOC refining apparatus in which when the VOC-containing liquid is sprayed into the processing device, the particle diameter can be reduced, the evaporation rate of moisture is improved, and refining processing capacity of the VOC is enhanced.

Hereinafter, an exemplary embodiment of the disclosure will be described with reference to the drawings.

Figure 1:
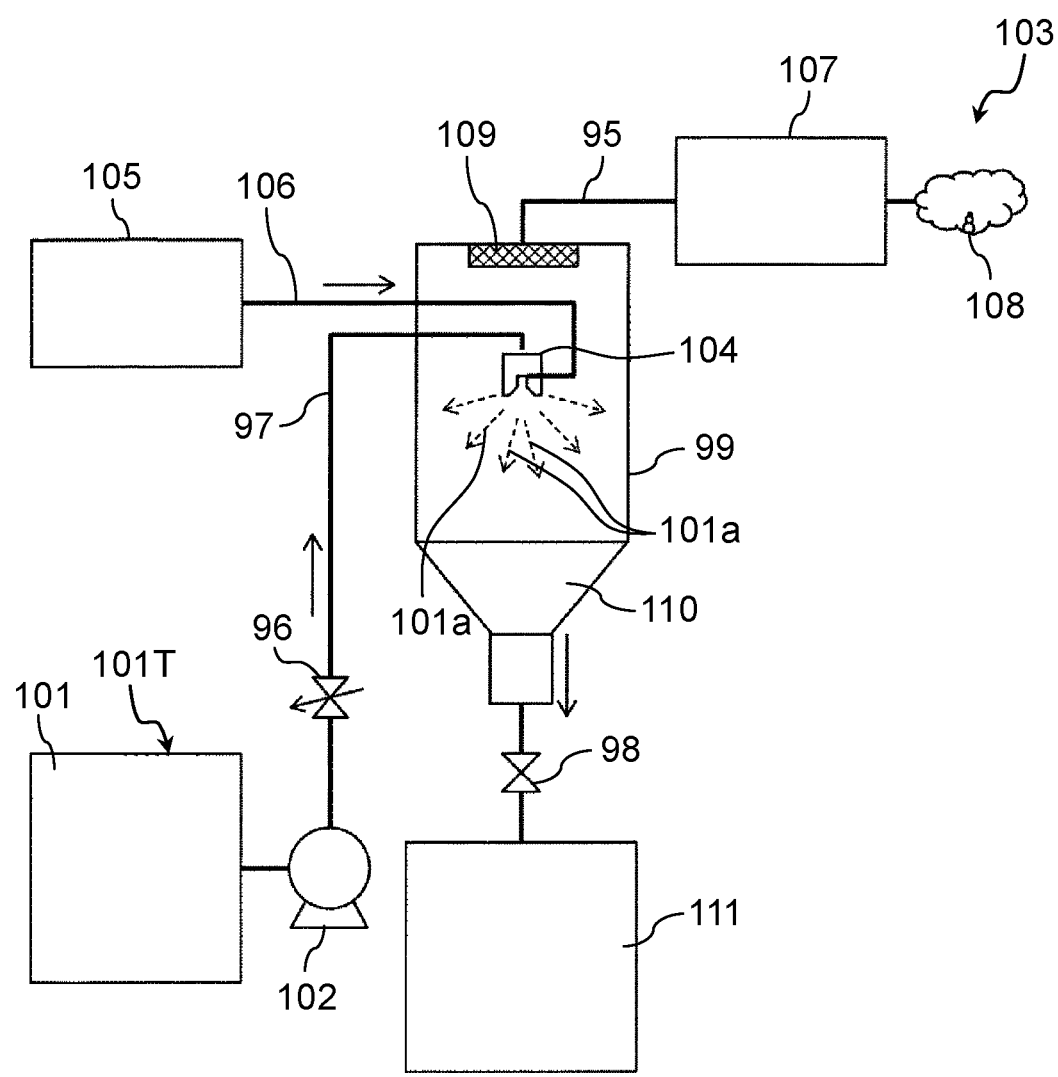
FIG. 1 is a view of a configuration of a VOC refining apparatus in an exemplary embodiment of the disclosure.

FIG. 1 is a view of a configuration of a VOC refining apparatus in the exemplary embodiment of the disclosure.

In FIG. 1, VOC refining apparatus 103 at least includes the vacuum container 99, liquid feeding pump 102, spraying device 104, vacuum pump 107, and liquid discharge opening and closing valve 98 that is an example of a liquid discharge member.

Liquid feeding pump 102 supplies VOC-containing liquid 101 including water into vacuum container 99.

Spraying device 104 is a two-fluid nozzle that is disposed in vacuum container 99 and sprays VOC-containing liquid 101 supplied from liquid feeding pump 102 into vacuum container 99.

Vacuum pump 107 is connected to vacuum container 99 and depressurizes an inside of vacuum container 99 to vacuum-evaporate moisture included in VOC-containing liquid 101.

Liquid discharge opening and closing valve 98 discharges a VOC-concentrated liquid after moisture evaporation processing from vacuum container 99.

VOC-containing liquid 101 to be processed in VOC refining apparatus 103, that is, VOC-containing liquid 101 that is collected for refining processing in VOC refining apparatus 103 is held in VOC-containing liquid tank 101T. VOC-containing liquid tank 101T is connected to vacuum container 99 by liquid feeding pipe 97, liquid feeding pump 102 and variable valve 96 are disposed in the middle of liquid feeding pipe 97, and VOC-containing liquid 101 in VOC-containing liquid tank 101T is fed into vacuum container 99 by a predetermined amount by using liquid feeding pump 102. In this case, VOC-containing liquid 101 is directly connected to spraying device 104 in vacuum container 99 through liquid feeding pipe 97, compressed air 106 is supplied from compressor 105 to spraying device 104, and VOC-containing liquid 101 is sprayed from an inside of spraying device 104 into vacuum container 99 in a state of being atomized (see arrows 101a).

On the other hand, in vacuum container 99, air is exhausted by vacuum pump 107 connected to vacuum container 99 with exhaust pipe 95 and vacuum container 99 is in a depressurized vacuum state.

Since the VOC in VOC-containing liquid 101 sprayed from spraying device 104 is a hydrophilic and volatile chemical substance having a higher boiling point than that of water and being not to be azeotropic with water, when reaching a vapor pressure of water under reduced pressure, only moisture is mainly volatilized and discharge moisture 108 is discharged to the outside via vacuum pump 107. In this case, mist filter 109 as an example of a mist trap is installed in a direct connection portion of exhaust pipe 95 between vacuum container 99 and vacuum pump 107 so that the VOC-containing liquid is not sucked. VOC-containing liquid 101 is captured by mist filter 109 and is prevented from passing through mist filter 109 and mixing into an exhaust system.

VOC-concentrated liquid 110, in which only moisture is removed and which is in a concentrated state, is accumulated at a lower portion of vacuum container 99 through the process described above. At a stage in which VOC-concentrated liquid 110 is accumulated by a predetermined amount, liquid discharge opening and closing valve 98 is opened to store VOC-concentrated liquid 110 in VOC refining tank 111. Stored VOC-concentrated liquid 110 can be in a greatly concentrated state compared to VOC-containing liquid 101 input into vacuum container 99.

Figure 2A:
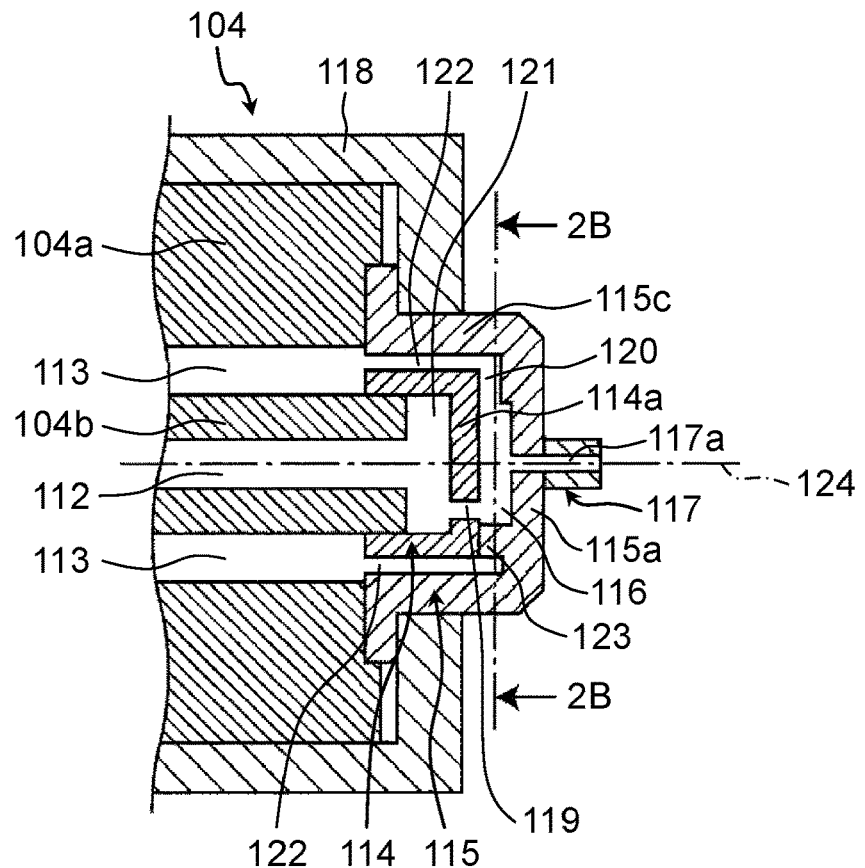
FIG. 2A is a cross-sectional end view of a spraying device in the exemplary embodiment of the disclosure.

Spraying device 104 of the exemplary embodiment will be described with reference to FIG. 2A. FIG. 2A is a cross-sectional end view of spraying device 104 in the exemplary embodiment of the disclosure.

Spraying device 104 at least includes spraying device main body 104a, inner lid 114, outer lid 115, gas-liquid mixing section 116, liquid inlet 119, gas inlet 120, and spout 117a.

Gas-liquid mixing section 116 is configured of inner lid 114 and outer lid 115. Spraying device 104 further includes spraying device lid securing portion 118.

Spraying device main body 104a is formed of liquid passageway 112 that is disposed at a center portion of a columnar member along an axial direction and cylindrical gas passageway 113 that is disposed around liquid passageway 112 with intervals along the axial direction respectively. Liquid passageway 112 and gas passageway 113 are partitioned by cylindrical portion 104b positioned at the center portion as a part of spraying device main body 104a. Only a tip side of liquid passageway 112 is illustrated and a liquid supply port (not illustrated) at a rear end is connected to liquid feeding pump 102 via liquid feeding pipe 97. Also, only a tip side of gas passageway 113 is illustrated and a gas supply port (not illustrated) at a rear end is connected to compressor 105 and compressed air 106 is supplied to gas passageway 113.

The tip of cylindrical portion 104b slightly protrudes to the tip side from spraying device main body 104a except cylindrical portion 104b and inner lid 114 is fixed to the tip thereof.

Inner lid 114 is disposed at the tip of spraying device main body 104a, covers an opening of liquid passageway 112, and has a generally C-shaped cross-section having flat inner end portion 114a. First space 121 of a disc-shaped profile is formed between an end surface of cylindrical portion 104b and an inner surface of inner end portion 114a of inner lid 114. Liquid inlet 119 penetrating inner end portion 114a in the axial direction is formed at one portion of an outer peripheral portion of inner end portion 114a of inner lid 114. That is, liquid inlet 119 is positioned at inner end portion 114a of inner lid 114 that is an upstream-side flat surface in the vicinity of an outer peripheral wall surface of gas-liquid mixing section 116, and allows liquid passageway 112 and gas-liquid mixing section 116 to communicate with each other.

Outer lid 115 is disposed at the tip of spraying device main body 104a, covers inner lid 114, covers an opening of gas passageway 113, and has a generally Ω-shaped cross-section having flat outer end portion 115a facing inner end portion 114a of inner lid 114 and outer lid side surface 115c corresponding to the cylindrical side surface. Outer lid 115 is securely sandwiched between the end surface of spraying device main body 104a and spraying device lid securing portion 118 so as to cover inner lid 114 with second space 122 having a cylindrical profile with a predetermined interval at a side portion between outer lid 115 and inner lid 114, and cover inner lid 114 while forming gas-liquid mixing section 116 of a space of a disc-shaped profile with a predetermined interval at an end portion between outer lid 115 and inner lid 114. Outer lid 115 may be directly fixed to the end surface of spraying device main body 104a without spraying device lid securing portion 118.

In order to reliably form gas-liquid mixing section 116 of the disc-shaped profile with a predetermined interval between outer lid 115 and inner lid 114, annular projection portion 123 is formed on an inner surface of outer end portion 115a of outer lid 115. Therefore, gas-liquid mixing section 116 can be forcedly formed as a space between the inner surface of outer end portion 115a of outer lid 115 and the outer surface of inner end portion 114a of inner lid 114. Annular projection portion 123 may be provided on the outer surface of inner end portion 114a of inner lid 114 instead of being provided on the inner surface of outer end portion 115a of outer lid 115. Gas-liquid mixing section 116 having such a configuration is provided for mixing the gas flow flowing through gas passageway 113 and the liquid flow flowing through liquid passageway 112.

Gas inlet 120 allowing gas passageway 113 and gas-liquid mixing section 116 to communicate with each other is formed at the side portion of gas-liquid mixing section 116 by cutting a part of annular projection portion 123 in a radial direction. Gas inlet 120 is disposed so that an entering direction of the gas flow entering from gas inlet 120 intersects with an entering direction of the liquid flow entering from liquid inlet 119. Gas inlet 120 is located at a position facing liquid inlet 119, which is 180 degrees out of phase with liquid inlet 119 with respect to a center (central axis 124) of spraying device main body 104a. The cylindrical portion protrudes to be fixed and to form spout portion 117 having spout 117a penetrating outer end portion 115a and the cylindrical portion in the axial direction at a center of the outer surface of outer end portion 115a of outer lid 115. Spout 117a is disposed on same central axis 124 as liquid passageway 112. On the other hand, liquid inlet 119 is located at a position deviated from central axis 124.

Therefore, gas-liquid mixing section 116 is formed so as to be surrounded by annular projection portion 123, inner lid 114, and outer lid 115, and allows liquid inlet 119 penetrating inner lid 114 along the axial direction, gas inlet 120 formed by cutting annular projection portion 123 along a direction intersecting with the axial direction, and spout 117a penetrating outer lid 115 along the axial direction to communicate with each other.

In such a configuration, the liquid supplied to spraying device 104 becomes the liquid flow flowing through liquid passageway 112 from the liquid supply port (not illustrated) on the apparatus tip side with respect to spraying device main body 104a, and the liquid flow is supplied to gas-liquid mixing section 116 through first space 121 and liquid inlet 119. Gas supplied to spraying device 104 becomes the gas flow flowing through gas passageway 113 from the gas supply port (not illustrated) on the apparatus tip side with respect to spraying device main body 104a, and the gas flow is supplied to gas-liquid mixing section 116 through second space 122 and gas inlet 120.

When the gas flow and the liquid flow are supplied to gas-liquid mixing section 116, the gas flow and the liquid flow are mixed with each other in gas-liquid mixing section 116, the liquid is atomized, and then the mixed and atomized liquid spouts to an outside from spout 117a of spout portion 117 provided in outer lid 115.

Hereinafter, an atomizing mechanism in gas-liquid mixing section 116 will be described with reference to FIG. 2B.

Figure 2B:
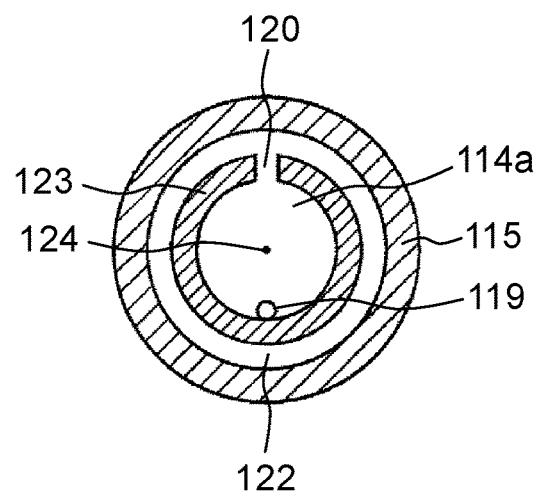
FIG. 2B is a sectional view that is taken along line 2B-2B of FIG. 2A of the spraying device in the exemplary embodiment of the disclosure.

The liquid flow flowing through liquid passageway 112 passes through first space 121 and passes through liquid inlet 119 provided in inner lid 114, and as illustrated in FIG. 2B, the liquid flow is supplied from the vicinity of annular projection portion 123 of gas-liquid mixing section 116 to the direction of spout portion 117.

On the other hand, gas supplied to gas-liquid mixing section 116 through gas inlet 120 located at the position facing liquid inlet 119 with respect to the liquid flow supplied from liquid inlet 119 to gas-liquid mixing section 116 collides with the liquid in gas-liquid mixing section 116. As a result of such a collision, the liquid spreads out to annular projection portion 123 to form a thin film and flow in the circumferential direction of annular projection portion 123, thereby changing from the thin film shape to finer liquid droplets. Furthermore, a gas-liquid mixed flow including the liquid droplets is circulated and aggregated along annular projection portion 123 of gas-liquid mixing section 116. Therefore, the liquid droplets can further be atomized and allow a liquid having a smaller particle diameter to be sprayed from spout 117*a*.

More specifically, the spraying device includes gas-liquid mixing section 116 having a diameter of 8.0 mm and a height of 2.0 mm, spout 117*a* of spout portion 117 having a diameter of 1.5 mm and a length of 2.0 mm, liquid inlet 119 having a diameter of 0.7 mm, and rectangular gas inlet 120 having a width of 1.0 mm and a height of 1.0 mm.

The spraying device was supplied with a compressed air, which is an example of the gas, pressurized by 0.2 MPa (gauge pressure) and water, which is an example of the liquid, pressurized by 0.15 MPa (gauge pressure). A Sauter mean particle diameter of the water atomized under the above conditions was evaluated by a laser diffraction technique. A measurement according to the laser diffraction technique was carried out at a position of 300 mm away from the tip of the spraying device and Sauter mean particle diameter was 10.0 μm.

According to spraying device 104 of the exemplary embodiment, in gas-liquid mixing section 116 provided between inner lid 114 and outer lid 115, the liquid entering from liquid inlet 119 and the gas entering from gas inlet 120 collide, circulate, and aggregate along annular projection portion 123, and the liquid is atomized, thereby allowing the atomized liquid to be spout from spout portion 117. As a result, spraying device 104, which is capable of spraying a liquid vaporizing so quickly and having a small particle diameter which does not feel wet or the like, can be provided. More specifically, two-fluid nozzle spraying device 104 can be provided which is capable of spraying a liquid having a particle diameter of 10 μm or less as an example of the particle diameter in which evaporation is performed quickly.

Figure 3:
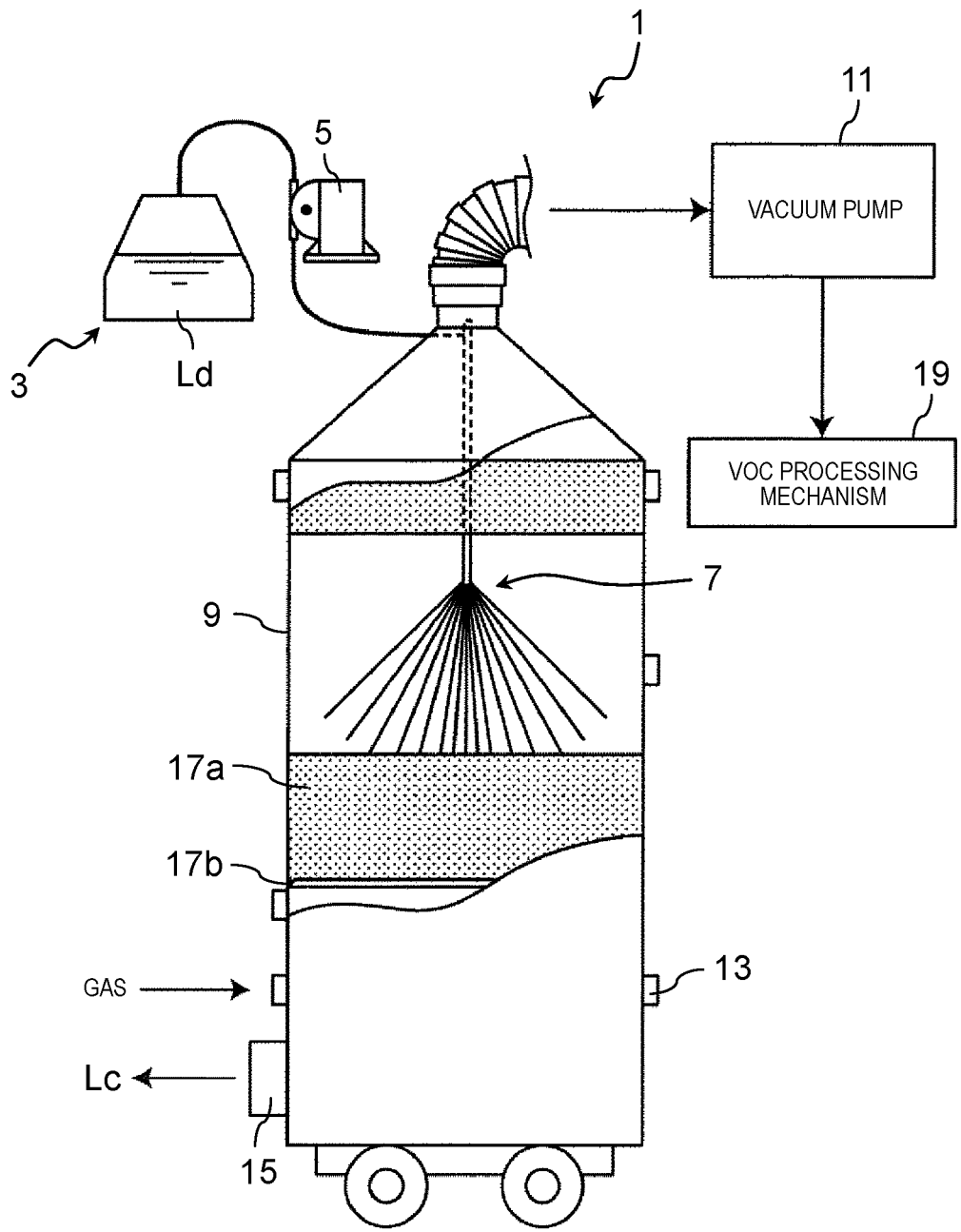
FIG. 3 is a view of a configuration of a VOC collecting and separating apparatus in the related art.

In the VOC refining processing method of the related art, as illustrated in FIG. 3, only the VOC-containing liquid is pressurized and the removing liquid is introduced into the VOC refining apparatus by using the single-fluid spraying nozzle. Therefore, the particle diameter of the VOC-containing liquid after spraying is large and a rate at which only moisture is evaporated and separated was not sufficient. However, in the exemplary embodiment of the disclosure, VOC-containing liquid 101 is sprayed by using compressed air 106 by compressor 105 from spraying device 104 that is the two-fluid nozzle and thereby the particle diameter of VOC-containing liquid 101 can be greatly atomized. Therefore, since the surface area per unit flow amount is increased, it is possible to greatly evaporate and exhaust only water in the VOC-containing liquid. Therefore, it is possible to refine and process the VOC-containing liquid of a high concentration which is greatly concentrated.

In the exemplary embodiment, when VOC-containing liquid 101 is sprayed by spraying device 104, compressed air 106 from compressor 105 is used, and the compressed air contains a very small amount of moisture because a dew point is lower than that the atmospheric air. Therefore, in the related art, the compressed air is purged to the atmospheric air and intentionally caused to flow, and thereby a large amount of moisture is also introduced into the vacuum container. Therefore, it may be difficult to maintain the reduced pressure in vacuum container 99. On the other hand, in the exemplary embodiment, the problem of the related art can be solved, only moisture can be efficiently evaporated from the VOC-containing liquid, and the VOC-containing liquid can be concentrated and processed by using the compressed air described above. In a case where the VOC-containing liquid is oxidized, it is possible to have a similar role by using an inert gas of nitrogen, argon, or helium instead of compressed air 106 from compressor 105.

The VOC capable of such concentration processing is a volatile chemical substance having a higher boiling point than that of water and a hydrophilic property not to be azeotropic with water, and may be one or a plurality of solvents selected from the group consisting of N-methyl pyrrolidone (NMP), ethylene glycol (EG), diethylene glycol (DEG), triethylene glycol (TEG), propylene glycol monoethyl ether (PGME), propylene glycol (PG), N,N-dimethylformamide (DMF), N,N-dimethylacetamide (DMAC), dimethylsulfoxide (DMSO), 1,4-butanediol (1,4-BD), monoethanolamine (MEA), and diethylene glycol monomethyl ether (DGME).

According to the exemplary embodiment, since VOC-containing liquid 101 is sprayed into vacuum container 99 functioning as the VOC collecting apparatus by using spraying device 104 that is the two-fluid nozzle, the particle diameter of VOC-containing liquid 101 can be greatly reduced and it is possible to vacuum-evaporate moisture from VOC-containing liquid 101. Therefore, evaporation and separation of moisture from VOC-containing liquid 101 accelerate, and there is an effect that refining processing efficiency of the VOC improves. Moisture mixed with air introduced as evaporation promoting gas can be dramatically reduced by using the compressed air of compressor 105.

It is possible to achieve the respective effects included in exemplary embodiments by suitably combining any exemplary embodiment or modification example of the above-described various exemplary embodiments or modification examples. Combinations of the exemplary embodiments, combinations of the examples, or combinations of the exemplary embodiments and the examples are possible and combinations of features in different exemplary embodiments or examples are also possible.

The VOC refining apparatus according to the above aspect of the disclosure has an effect of greatly increasing the refining and providing efficiency of the VOC and can reduce the cost required for refining, for example, ½ or less compared to the VOC refining and processing method. Therefore, it will contribute greatly to management by refining and reusing the VOC at manufacturing sites. Such a VOC refining apparatus may lead to a large equipment sales business globally for the manufacturing industry such as batteries and semiconductors.

What is claimed is:

1. A volatile organic compounds (VOC) refining apparatus comprising:
   a vacuum container:
   a liquid feeding pump that supplies a VOC-containing liquid including water into the vacuum container;
   a spraying device that is disposed in the vacuum container and sprays the VOC-containing liquid supplied from the liquid feeding pump into the vacuum container;
   a vacuum pump that is connected to the vacuum container and depressurizes an inside of the vacuum container to vacuum-evaporate moisture included in the VOC-containing liquid; and
   a liquid discharge member that discharges a VOC-concentrated liquid after moisture evaporation processing from the vacuum container,
   wherein the spraying device includes
   a spraying device main body that has a liquid passageway and a gas passageway,
   an inner lid that is disposed at a tip of the spraying device main body, covers an opening of the liquid passageway, and has a flat inner end portion,
   an outer lid that is disposed at the tip of the spraying device main body, covers the inner lid, covers an opening of the gas passageway, and has a flat outer end portion facing the inner end portion of the inner lid,
   a gas-liquid mixing section that is disposed between the inner lid and the outer lid, is formed at a space of a disc-shaped profile between the inner end portion of the inner lid and the outer end portion of the outer lid, and mixes a gas flow flowing through the gas passageway and a liquid flow flowing through the liquid passageway,
   a liquid inlet that is provided so as to penetrate at least one portion of the inner end portion of the inner lid in an axial direction at a position away from a central axis of the spraying device, communicates with the gas-liquid mixing section, and allows a liquid flow flowing along the central axis through the liquid passageway to enter the gas-liquid mixing section,
   a gas inlet that is disposed so as to communicate with the gas-liquid mixing section on a side portion of the gas-liquid mixing section between the inner lid and the outer lid, and allows the gas flow flowing through the gas passageway to enter the gas-liquid mixing section toward the liquid flow entering the gas-liquid mixing section from the liquid inlet, and
   a spout that is provided so as to penetrate the outer end portion of the outer lid, communicates with the gas-liquid mixing section, and spouts a liquid atomized by mixing the gas flow and the liquid flow in the gas-liquid mixing section.

2. The VOC refining apparatus of claim 1,
wherein an inert gas of nitrogen, argon, or helium is supplied into the vacuum container through the gas passageway of the spraying device main body.

3. The VOC refining apparatus of claim 1,
wherein a mist trap for capturing the sprayed VOC-containing liquid is disposed at a connecting portion in the vacuum container of an exhaust pipe from the vacuum container to the vacuum pump.

4. The VOC refining apparatus of claim 2,
wherein a mist trap for capturing the sprayed VOC-containing liquid is disposed at a connecting portion in the vacuum container of an exhaust pipe from the vacuum container to the vacuum pump.

5. The VOC refining apparatus of claim 1,
wherein a VOC contained in the VOC-containing liquid is a volatile chemical substance having a higher boiling point than a boiling point of water and a hydrophilic property not to be azeotropic with water, and is a solvent selected from the group consisting of N-methyl pyrrolidone, ethylene glycol, diethylene glycol, triethylene glycol, propylene glycol monoethyl ether, propylene glycol, N,N-dimethylformamide, N,N-dimethylacetamide, dimethylsulfoxide, 1,4-butanediol, monoethanolamine, and diethylene glycol monomethyl ether.

6. The VOC refining apparatus of claim 2,
wherein a VOC contained in the VOC-containing liquid is a volatile chemical substance having a higher boiling point than a boiling point of water and a hydrophilic property not to be azeotropic with water, and is a solvent selected from the group consisting of N-methyl pyrrolidone, ethylene glycol, diethylene glycol, triethylene glycol, propylene glycol monoethyl ether, propylene glycol, N,N-dim ethyl formamide, N,N-dim ethyl acetamide, dimethylsulfoxide, 1,4-butanediol, monoethanolamine, and diethylene glycol monomethyl ether.

7. The VOC refining apparatus of claim 3,
wherein a VOC contained in the VOC-containing liquid is a volatile chemical substance having a higher boiling point than a boiling point of water and a hydrophilic property not to be azeotropic with water, and is a solvent selected from the group consisting of N-methyl pyrrolidone, ethylene glycol, diethylene glycol, triethylene glycol, propylene glycol monoethyl ether, propylene glycol, N,N-dimethylformamide, N,N-dim ethyl acetamide, dimethylsulfoxide, 1,4-butanediol, monoethanolamine, and diethylene glycol monomethyl ether.

8. The VOC refining apparatus of claim 4,
wherein a VOC contained in the VOC-containing liquid is a volatile chemical substance having a higher boiling point than a boiling point of water and a hydrophilic property not to be azeotropic with water, and is a solvent selected from the group consisting of N-methyl pyrrolidone, ethylene glycol, diethylene glycol, triethylene glycol, propylene glycol monoethyl ether, propylene glycol, N,N-dimethylformamide, N,N-dim ethyl acetamide, dimethylsulfoxide, 1,4-butanediol, monoethanolamine, and diethylene glycol monomethyl ether.

9. The VOC refining apparatus of claim 1, further comprising:

a compressor that supplies compressed air to the spraying device.

10. The VOC refining apparatus of claim 1,
wherein the inner lid substantially covers an entire opening of the liquid passageway.

11. The VOC refining apparatus of claim 1,
wherein the outer lid substantially covers the inner lid in its entirety.

12. A volatile organic compounds (VOC) refining apparatus comprising:
a vacuum container:
a liquid feeding pump that supplies a VOC-containing liquid including water into the vacuum container;
a spraying device that is disposed in the vacuum container and sprays the VOC-containing liquid supplied from the liquid feeding pump into the vacuum container;
a vacuum pump that is connected to the vacuum container and depressurizes an inside of the vacuum container to vacuum-evaporate moisture included in the VOC-containing liquid; and
a liquid discharge member that discharges a VOC-concentrated liquid after moisture evaporation processing from the vacuum container,
wherein the spraying device includes
a spraying device main body that has a liquid passageway and a gas passageway,
an inner lid that is disposed at a tip of the spraying device main body, covers an opening of the liquid passageway, and has a flat inner end portion,
an outer lid that is disposed at the tip of the spraying device main body, covers the inner lid, covers an opening of the gas passageway, and has a flat outer end portion facing the inner end portion of the inner lid,
a gas-liquid mixing section that is disposed between the inner lid and the outer lid, is formed at a space of a disc-shaped profile between the inner end portion of the inner lid and the outer end portion of the outer lid, and mixes a gas flow flowing through the gas passageway and a liquid flow flowing through the liquid passageway,
a liquid inlet that is provided so as to penetrate at least one portion of the inner end portion of the inner lid in an axial direction, communicates with the gas-liquid mixing section, and allows a liquid flow flowing through the liquid passageway to enter the gas-liquid mixing section,
a gas inlet that is disposed so as to communicate with the gas-liquid mixing section on a side portion of the gas-liquid mixing section between the inner lid and the outer lid, and allows the gas flow flowing through the gas passageway to enter the gas-liquid mixing section toward the liquid flow entering the gas-liquid mixing section from the liquid inlet, and
a spout that is provided on a central axis of the spraying device so as to penetrate the outer end portion of the outer lid, communicates with the gas-liquid mixing section, and spouts a liquid atomized by mixing the gas flow and the liquid flow in the gas-liquid mixing section.

13. A volatile organic compounds (VOC) refining apparatus comprising:
a vacuum container:
a liquid feeding pump that supplies a VOC-containing liquid including water into the vacuum container;
a spraying device that is disposed in the vacuum container and sprays the VOC-containing liquid supplied from the liquid feeding pump into the vacuum container;

a vacuum pump that is connected to the vacuum container and depressurizes an inside of the vacuum container to vacuum-evaporate moisture included in the VOC-containing liquid; and a liquid discharge member that discharges a VOC-concentrated liquid after moisture evaporation processing from the vacuum container, wherein the spraying device includes a spraying device main body that has a liquid passageway and a gas passageway, an inner lid that is disposed at a tip of the spraying device main body, covers an opening of the liquid passageway and restricts liquid from flowing along a central axis of the spraying device where the opening is covered by the inner lid, and has a flat inner end portion, an outer lid that is disposed at the tip of the spraying device main body, covers the inner lid, covers an opening of the gas passageway, and has a flat outer end portion facing the inner end portion of the inner lid, a gas-liquid mixing section that is disposed between the inner lid and the outer lid, is formed at a space of a disc-shaped profile between the inner end portion of the inner lid and the outer end portion of the outer lid, and mixes a gas flow flowing through the gas passageway and a liquid flow flowing through the liquid passageway, a liquid inlet that is provided so as to penetrate at least one portion of the inner end portion of the inner lid in an axial direction, communicates with the gas-liquid mixing section, and allows a liquid flow flowing through the liquid passageway to enter the gas-liquid mixing section, a gas inlet that is disposed so as to communicate with the gas-liquid mixing section on a side portion of the gas-liquid mixing section between the inner lid and the outer lid, and allows the gas flow flowing through the gas passageway to enter the gas-liquid mixing section toward the liquid flow entering the gas-liquid mixing section from the liquid inlet, and a spout that is provided so as to penetrate the outer end portion of the outer lid, communicates with the gas-liquid mixing section, and spouts a liquid atomized by mixing the gas flow and the liquid flow in the gas-liquid mixing section.

\* \* \* \* \*